(12) United States Patent
Oba

(10) Patent No.: US 7,968,821 B2
(45) Date of Patent: Jun. 28, 2011

(54) LASER PROCESSING BEAM MACHINE

(75) Inventor: Ryugo Oba, Tokyo (JP)

(73) Assignee: Disco Corporation, Tokyo (JP)

( * ) Notice: Subject to any disclaimer, the term of this patent is extended or adjusted under 35 U.S.C. 154(b) by 1126 days.

(21) Appl. No.: 11/727,753

(22) Filed: Mar. 28, 2007

(65) Prior Publication Data

US 2007/0228020 A1 Oct. 4, 2007

(30) Foreign Application Priority Data

Apr. 4, 2006 (JP) ................................. 2006-103502

(51) Int. Cl.
*B23K 26/06* (2006.01)
(52) U.S. Cl. .......... 219/121.75; 219/121.73; 219/121.78
(58) Field of Classification Search ............. 219/121.75, 219/121.73, 121.78, 121.6
See application file for complete search history.

(56) References Cited

U.S. PATENT DOCUMENTS

| 1,953,299 | A | * | 4/1934 | Grant ................................ 362/89 |
| 6,580,054 | B1 | | 6/2003 | Liu et al. |
| 6,960,739 | B2 | | 11/2005 | Liu et al. |
| 2003/0226832 | A1 | * | 12/2003 | Liu et al. .................. 219/121.69 |

FOREIGN PATENT DOCUMENTS

| JP | 07068392 A | * | 3/1995 |
| JP | 2004-9139 | | 1/2004 |
| JP | 2006116570 A | * | 5/2006 |

* cited by examiner

*Primary Examiner* — M. Alexandra Elve
(74) *Attorney, Agent, or Firm* — Smith, Gambrell & Russell, LLP

(57) ABSTRACT

A laser processing beam machine comprising a chuck table for holding a workpiece, a laser beam application means for applying a laser beam to the workpiece held on the chuck table, and a processing-feed means for moving the chuck table and the laser beam application means relative to each other, wherein the laser beam application means comprises a laser beam oscillation means for oscillating a laser beam and a condenser for converging the laser beam oscillated by the laser beam oscillation means; and the condenser comprises a condenser lens opposed to the workpiece held on the chuck table, a cylindrical lens arranged on the upstream side in the laser beam application direction of the condenser lens, and an interval adjustment mechanism for adjusting the interval between the condenser lens and the cylindrical lens.

1 Claim, 15 Drawing Sheets

(a)

(b)

LASER PROCESSING BEAM MACHINE

FIELD OF THE INVENTION

The present invention relates to a laser processing beam machine for carrying out the laser processing of a workpiece such as a semiconductor wafer and, more specifically, to a laser processing beam machine capable of adjusting the shape of the focal spot of a laser beam.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a device such as IC or LSI is formed in each of the sectioned areas. Individual semiconductor chips are manufactured by cutting this semiconductor wafer along the streets to divide it into the areas in each of which the device is formed. An optical device wafer having light receiving devices such as photodiodes or light emitting devices such as laser diodes laminated on the front surface of a sapphire substrate is also cut along streets to be divided into individual optical devices such as photodiodes or laser diodes which are widely used in electric appliances.

As a means of dividing a wafer such as the above semiconductor wafer or optical device wafer along the streets, JP-A 2004-9139 discloses a method in which a groove is formed by applying a pulse laser beam along the streets formed on the wafer, and the wafer is divided along the grooves.

The processing conditions can be suitably adjusted depending on the output, wavelength, repetition frequency, focal spot shape, etc. of the laser beam applied to the workpiece. However, it is difficult to suitably change the shape of the focal spot to a circle or an ellipse whose long axis and short axis differ from each other in length and hence, there arises a problem that the adjustment of the processing conditions is restricted.

SUMMARY OF THE INVENTION

It is an object of the present invention to provide a laser processing beam machine capable of easily changing the shape of the focal spot of a laser beam to a circle or an ellipse whose long axis and short axis differ from each other in length.

To attain the above object, according to the present invention, there is provided a laser processing beam machine comprising a chuck table for holding a workpiece, a laser beam application means for applying a laser beam to the workpiece held on the chuck table, and a processing-feed means for moving the chuck table and the laser beam application means relative to each other, wherein the laser beam application means comprises a laser beam oscillation means for oscillating a laser beam and a condenser for converging the laser beam oscillated by the laser beam oscillation means; and the condenser comprises a condenser lens opposed to the workpiece held on the chuck table, a cylindrical lens arranged on the upstream side in the laser beam application direction of the condenser lens, and an interval adjustment mechanism for adjusting the interval between the condenser lens and the cylindrical lens.

The above cylindrical lens is a convex lens and arranged to converge the laser beam in a processing-feed direction.

The above cylindrical lens is a concave lens and arranged to diverge the laser beam in a processing-feed direction.

According to the present invention, there is further provided a laser processing beam machine comprising a chuck table for holding a workpiece, a laser beam application means for applying a laser beam to the workpiece held on the chuck table, and a processing-feed means for moving the chuck table and the laser beam application means relative to each other, wherein the laser beam application means comprises a laser beam oscillation means for oscillating a laser beam and a condenser for converging the laser beam oscillated by the laser beam oscillation means; and the condenser comprises a condenser lens opposed to the workpiece held on the chuck table, a first cylindrical lens and a second cylindrical lens arranged on the upstream side in the laser beam application direction of the condenser lens, and an interval adjustment mechanism for adjusting the interval between the first cylindrical lens and the second cylindrical lens.

The above first cylindrical lens is arranged on the condenser side, the above second cylindrical lens is arranged on the upstream side in the laser beam application direction of the first cylindrical lens, and the above interval adjustment mechanism moves the second cylindrical lens to adjust the interval between the first cylindrical lens and the second cylindrical lens.

The first cylindrical lens is a convex lens and the second cylindrical lens is a concave lens.

The first cylindrical lens and the second cylindrical lens are arranged to converge or diverge the laser beam in the processing-feed direction.

Since the laser processing beam machine of the present invention comprises the interval adjustment mechanism for adjusting the interval between the condenser lens and the cylindrical lens to adjust the interval between the condenser lens and the cylindrical lens, a focal spot having a circular section and a focal spot having an elliptic section can be formed, and the ratio of the long axis to the short axis of the focal spot having an elliptic section can be suitably changed. Consequently, the shape of a focal spot suitable for laser processing can be suitably selected.

Since the laser processing beam machine of the present invention comprises the interval adjustment mechanism for adjusting the interval between the first cylindrical lens and the second cylindrical lens to adjust the interval between the first cylindrical lens and the second cylindrical lens, a focal spot having a circular section and a focal spot having an elliptic section can be formed, and the ratio of the long axis to the short axis of the focal spot having an elliptic section can be suitably changed. Consequently, the shape of a focal spot suitable for laser processing can be suitably selected.

DETAILED DESCRIPTION OF THE PREFERRED EMBODIMENTS

Preferred embodiments of a laser processing beam machine constituted according to the present invention will be described in more detail with reference to the accompanying drawings.

Figure 1:
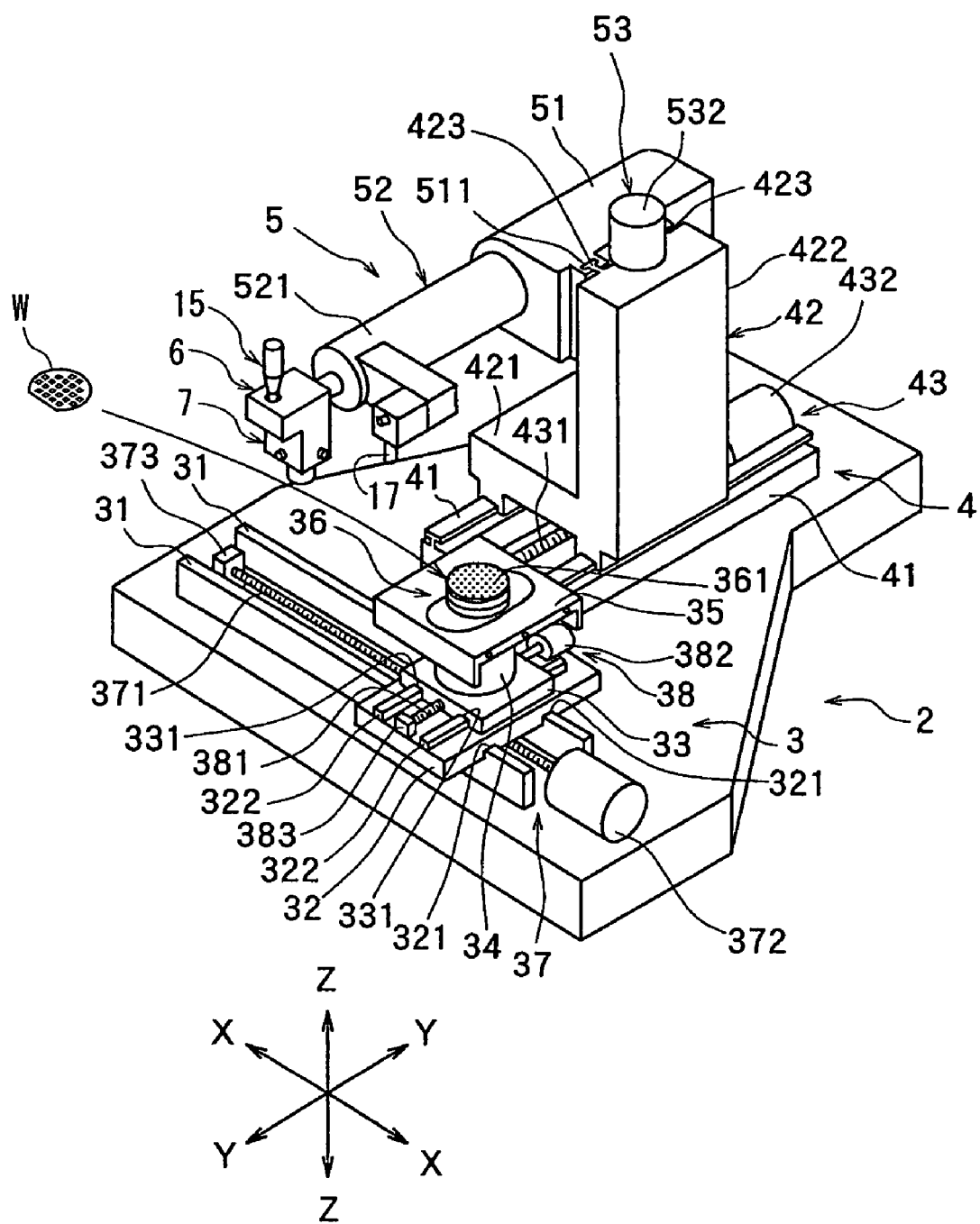
FIG. 1 is a perspective view of a laser processing beam machine constituted according to the present invention.

FIG. 1 is a perspective view of a laser processing beam machine constituted according to the present invention. The laser processing beam machine shown in FIG. 1 comprises a stationary base 2, a chuck table mechanism 3 for holding a workpiece, which is mounted on the stationary base 2 in such a manner that it can move in a processing-feed direction indicated by an arrow X, a laser beam application unit support mechanism 4 mounted on the stationary base 2 in such a manner that it can move in an indexing-feed direction indicated by an arrow Y perpendicular to the direction indicated by the arrow X, and a laser beam application unit 5 mounted on the laser beam application unit support mechanism 4 in such a manner that it can move in a direction indicated by an arrow Z.

The above chuck table mechanism 3 comprises a pair of guide rails 31 and 31 mounted on the stationary base 2 and arranged parallel to each other in the processing-feed direction indicated by the arrow X, a first sliding block 32 mounted on the guide rails 31 and 31 in such a manner that it can move in the processing-feed direction indicated by the arrow X, a second sliding block 33 mounted on the first sliding block 32 in such a manner that it can move in the indexing-feed direction indicated by the arrow Y, a cover table 35 supported on the second sliding block 33 by a cylindrical member 34, and a chuck table 36 as a workpiece holding means. This chuck table 36 comprises an adsorption chuck 361 made of a porous material, and a workpiece, for example, a disk-like semiconductor wafer is held on the adsorption chuck 361 by a suction means that is not shown. The chuck table 36 constituted as described above is rotated by a pulse motor (not shown) installed in the cylindrical member 34.

The above first sliding block 32 has, on the undersurface, a pair of to-be-guided grooves 321 and 321 to be fitted to the above pair of guide rails 31 and 31 and, on the top surface, a pair of guide rails 322 and 322 formed parallel to each other in the indexing-feed direction indicated by the arrow Y. The first sliding block 32 constituted as described above can move along the pair of guide rails 31 and 31 in the processing-feed direction indicated by the arrow X by fitting the to-be-guided grooves 321 and 321 to the pair of guide rails 31 and 31, respectively. The chuck table mechanism 3 in the illustrated embodiment comprises a processing-feed means 37 for moving the first sliding block 32 along the pair of guide rails 31 and 31 in the processing-feed direction indicated by the arrow X. The processing-feed means 37 comprises a male screw rod 371 arranged between the above pair of guide rails 31 and 31 parallel thereto and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction indicated by the arrow X.

The above second sliding block 33 has, on the undersurface, a pair of to-be-guided grooves 331 and 331 to be fitted to the pair of guide rails 322 and 322 formed on the top surface of the above first sliding block 32 and is so constituted as to move in the indexing-feed direction indicated by the arrow Y by fitting the guide grooves 331 and 331 to the pair of to-be-guided rails 322 and 322, respectively. The chuck table mechanism 3 in the illustrated embodiment comprises a first indexing-feed means 38 for moving the second sliding block 33 in the indexing-feed direction indicated by the arrow Y along the pair of guide rails 322 and 322 formed on the first sliding block 32. The first indexing-feed means 38 comprises a male screw rod 381 which is arranged between the above pair of guide rails 322 and 322 parallel thereto and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction indicated by the arrow Y.

The above laser beam application unit support mechanism 4 comprises a pair of guide rails 41 and 41 mounted on the stationary base 2 and arranged parallel to each other in the indexing-feed direction indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z on one of its flanks. The laser beam application unit support mechanism 4 in the illustrated embodiment comprises a second indexing-feed means 43 for moving the movable support base 42 along the pair of guide rails 41 and 41 in the indexing-feed direction indicated by the arrow Y. This second indexing-feed means 43 comprises a male screw rod 431 arranged between the above pair of guide rails 41 and 41 parallel thereto and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or reverse direction with the pulse motor 432, the movable support base 42 is moved along the guide rails 41 and 41 in the indexing-feed direction indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 on the above mounting portion 422 and is supported in such a manner that it can move in the direction indicated by the arrow Z by fitting the to-be-guided grooves 511 and 511 to the above guide rails 423 and 423, respectively.

The laser beam application unit 5 in the illustrated embodiment comprises a moving means 53 for moving the unit holder 51 along the pair of guide rails 423 and 423 in the direction indicated by the arrow Z. The moving means 53 comprises a male screw rod (not shown) arranged between the pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction indicated by the arrow Z. In the illustrated embodiment, the laser beam application means 52 is moved up by driving the pulse motor 532 in a normal direction and moved down by driving the pulse motor 532 in the reverse direction.

Figure 2:
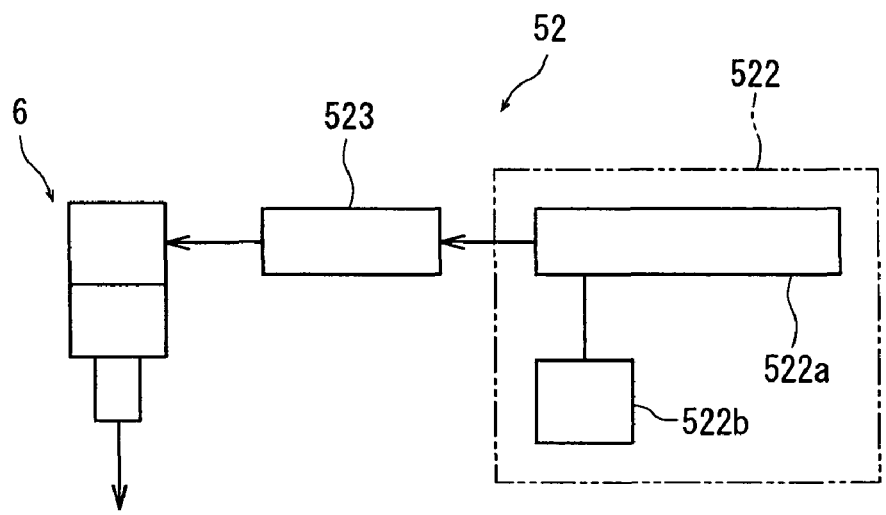
FIG. 2 is a constitutional block diagram of laser beam application means provided in the laser processing beam machine shown in FIG. 1.

The illustrated laser beam application means 52 has a cylindrical casing 521 that is secured to the above unit holder 51 and extends substantially horizontally. The laser beam application means 52 comprises a pulse laser beam oscillation means 522 and a transmission optical system 523 installed in the casing 521 as shown in FIG. 2 and a processing head 6 for applying a pulse laser beam oscillated by the pulse laser beam oscillation means 522 to the workpiece held on the above chuck table 36, which is attached to the end of the casing 521. The above pulse laser beam oscillation means 522 comprises a pulse laser beam oscillator 522a composed of a YAG laser oscillator or YVO4 laser oscillator and a repetition frequency setting means 522b connected to the pulse laser beam oscillator 522a. The transmission optical system 523 has suitable optical elements such as a beam splitter, etc.

Figure 3:
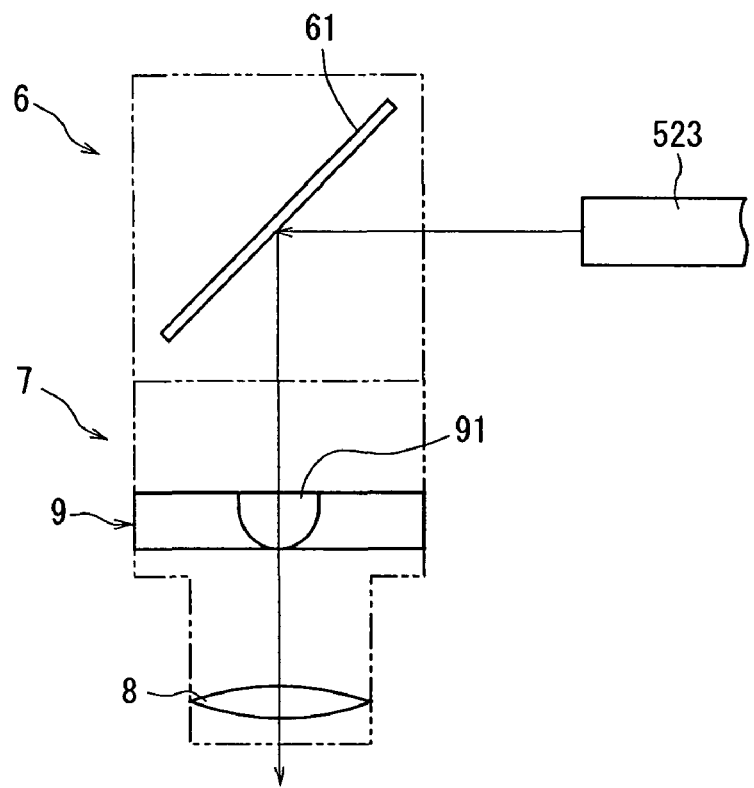
FIG. 3 is an explanatory diagram of a processing head comprising a condenser of a first embodiment constituting the laser beam application means shown in FIG. 2.
Figure 4:
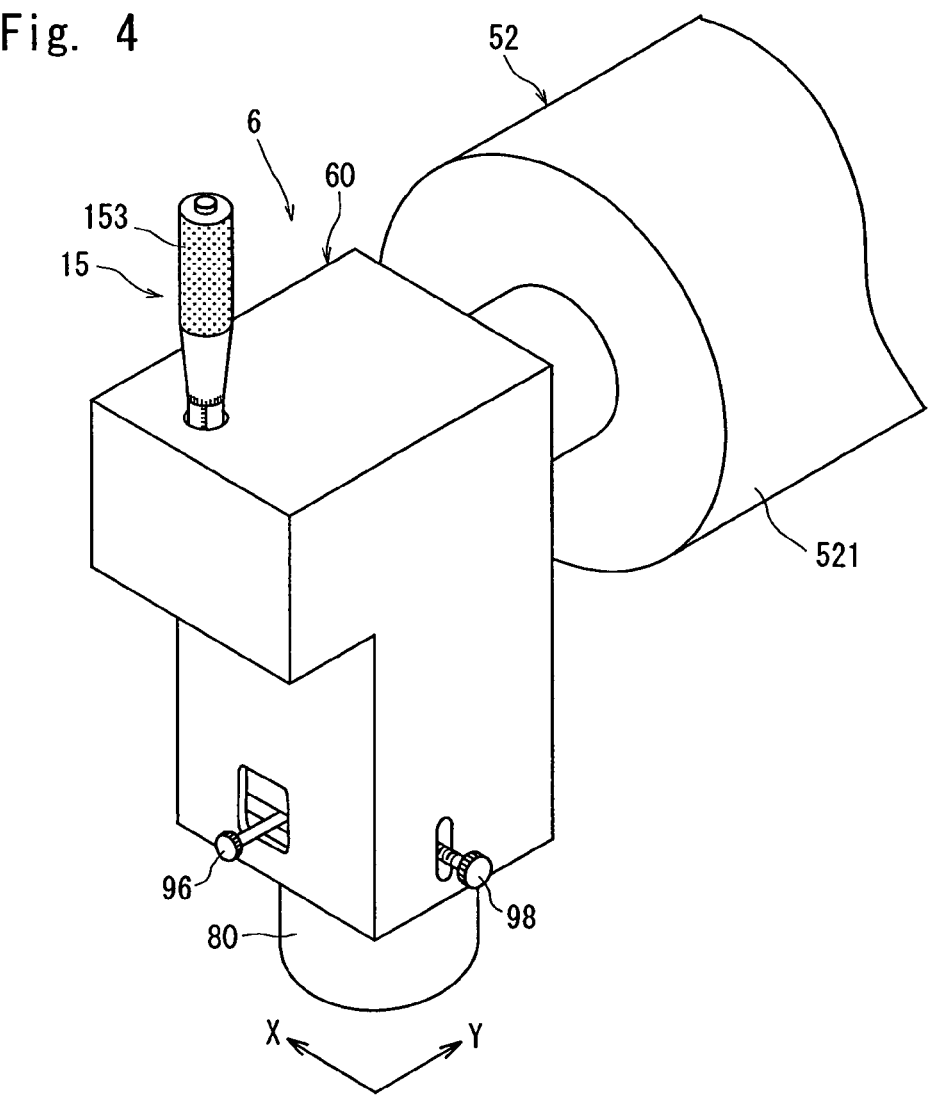
FIG. 4 is a perspective view of the processing head shown in FIG. 3.

The above processing head 6 comprises a direction changing mirror 61 and a condenser 7 as shown in FIG. 3. The direction changing mirror 61 changes the direction of the pulse laser beam oscillated from the above pulse laser beam oscillation means 522 and irradiated through the transmission optical system 523 toward the condenser 7. The condenser 7 in the illustrated first embodiment comprises a condenser lens 8 opposed to the workpiece held on the above chuck table 36, a cylindrical lens unit 9 arranged on the upstream side in the laser beam application direction of the condenser lens 8, that is, between the condenser lens 8 and the direction changing mirror 61, and an interval adjustment mechanism for adjusting the interval between the condenser lens 8 and the cylindrical lens unit 9, which will be described later. The above direction changing mirror 61, the cylindrical lens unit 9 and the interval adjustment mechanism later described are installed in a processing head housing 60 mounted on the end of the above casing 521 as shown in FIG. 4. The above condenser lens 8 is installed in a lens housing 80 attached to the bottom of the processing head housing 60. The focal distance of the condenser lens 8 is set to 40 mm in the illustrated embodiment.

Figure 5:
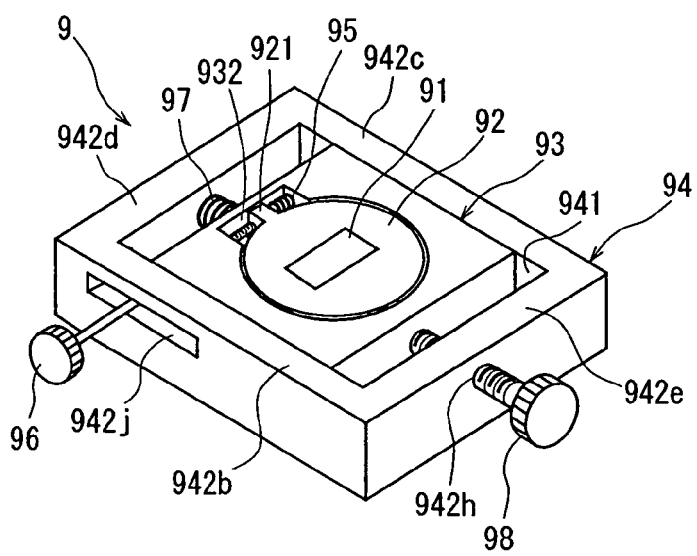
FIG. 5 is a perspective view of a cylindrical lens unit constituting the condenser of the processing head shown in FIG. 3.

A description will be subsequently given of the above cylindrical lens unit 9 with reference to FIGS. 5 to 7. FIG. 5 is a perspective view of the cylindrical lens unit 9 and FIG. 6 is an exploded perspective view of the cylindrical lens unit 9 shown in FIG. 5.

Figure 6:
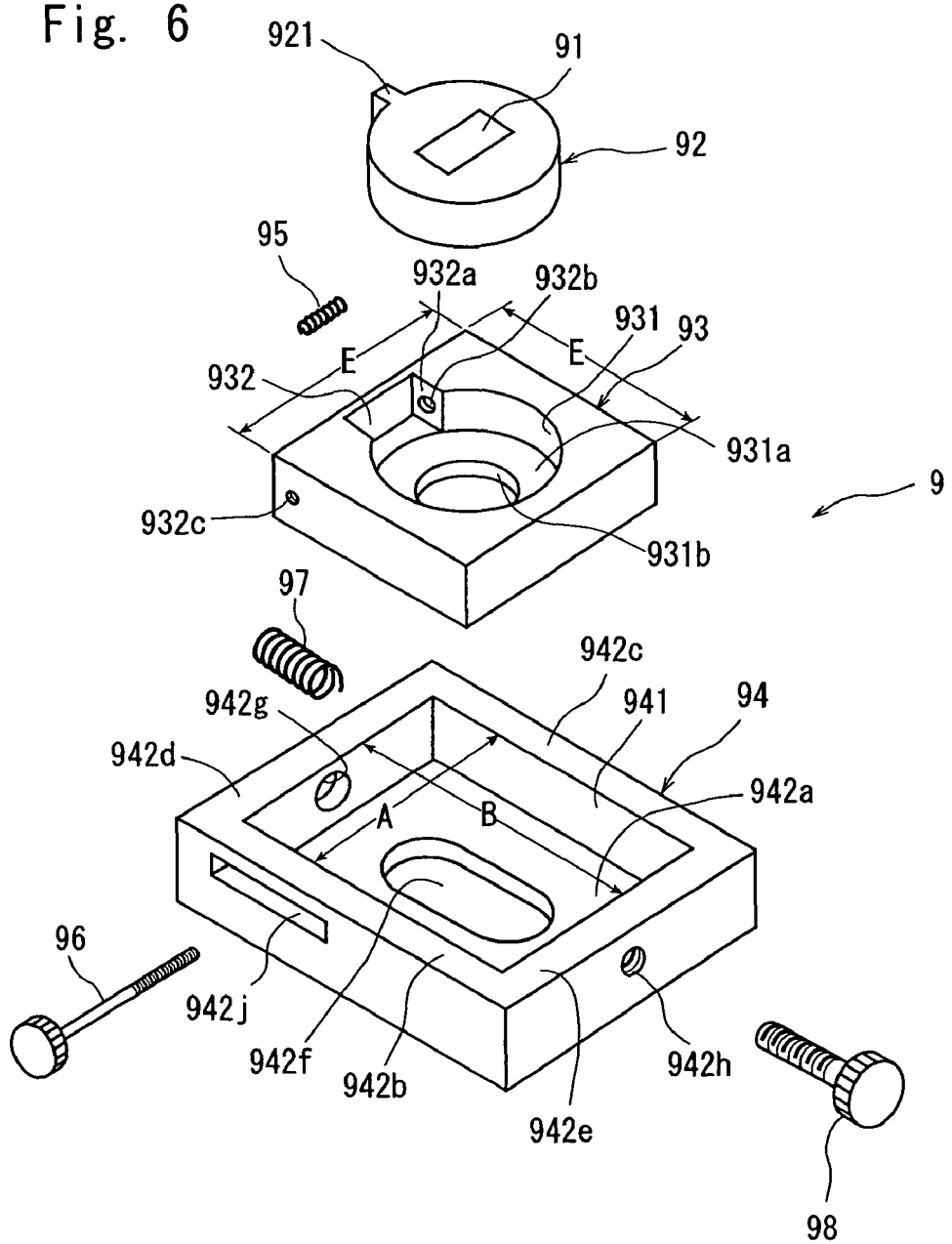
FIG. 6 is an exploded perspective view of the constituent members of the cylindrical lens unit shown in FIG. 5.

The cylindrical lens unit 9 shown in FIG. 5 and FIG. 6 comprises a cylindrical lens 91, a lens holding member 92 for holding the cylindrical lens, a first frame 93 for holding the lens holding member 92 and a second frame 94 for holding the first frame 93.

Figure 7:
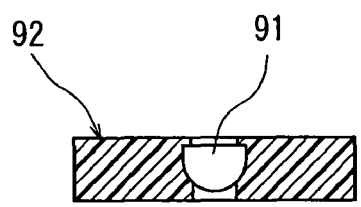
FIG. 7 is a sectional view of a lens holding member holding a cylindrical lens constituting the cylindrical lens unit shown in FIG. 5.

The cylindrical lens 91 is a convex lens having a semicircular section as shown in FIG. 7. The focal distance of this cylindrical lens 91 is set to 40 mm in the illustrated embodiment. The lens holding member 92 for holding the cylindrical lens 91 is circular and made of a synthetic resin in the illustrated embodiment. This cylindrical lens 91 is embedded in the lens holding member 92 made of a synthetic resin in such a manner that its top surface and bottom surface are exposed. A projecting piece 921 is formed at one position of the outer peripheral surface of the lens holding member 92 as shown in FIG. 6.

The above first frame 93 is a shape of square with a side length E, and a circular hollow 931 for accepting the above lens holding member 92 and a working chamber 932 for accepting the projecting piece 921 formed on the lens holding member 92 are formed in the top surface of the first frame 93 as shown in FIG. 6. A hole 931b is formed in the center portion of the bottom wall 931a of the circular hollow 931. Further, a recess 932b which is a spring seat is formed in a wall 932a sectioning the working chamber 932. A screw hole 932c is formed on the axis of the recess 932b in the first frame 93. The lens holding member 92 is fitted in the circular hollow 931 of the first frame 93 constituted as described above as shown in FIG. 5, and the projecting piece 921 is stored in the working chamber 932. Therefore, the lens holding member 92 fitted into the circular hollow 931 of the first frame 93 can turn along the inner peripheral portion of the circular hollow 931 as far as the projecting piece 921 can move within the working chamber 932. A compression coil spring 95 is interposed between the above recess 932b and the projecting piece 921. A first adjustment screw 96 is screwed into the above screw hole 932c, and the end of the first adjustment screw 96 is brought into contact with the projecting piece 921. Therefore, when the first adjustment screw 96 is moved forward by turning in one direction, the lens holding member 92 is turned in one direction against the spring force of the compression coil spring 95, and when the first adjustment screw 96 is moved backward by turning in the other direction, the lens holding member 92 is turned in the other direction by the spring force of the compression coil spring 95. Thus, the projecting piece 921 formed on the lens holding member 92, the first adjustment screw 96 and the compression coil spring 95 function as a turning adjustment means for turning the lens holding member 92 along the inner peripheral portion of the circular hollow 931.

The above second frame 94 is rectangular, and a rectangular hollow 941 for accepting the first frame 93 is formed in the top surface of the second frame 94 as shown in FIG. 6. This rectangular hollow 941 has a width A corresponding to the side length E of the above square first frame 93 and a length B larger than the side length E of the first frame 93. The rectangular hollow 941 is sectioned by a bottom wall 942a and side walls 942b, 942c, 942d and 942e. A hole 942f is formed in the center portion of the bottom wall 942a. A recess 942g which is a spring seat is formed in the inner surface of the side wall 942d sectioning the rectangular hollow 941. A screw hole 942h is formed in the side wall 942e opposite to the side wall 942d having the recess 942g. A prolonged hole 942j for accepting the above first adjustment screw 96 is formed in the side wall 942b of the second frame 94. The above first frame 93 is fitted in the rectangular hollow 941 of the second frame 94 constituted as described above as shown in FIG. 5. A compression coil spring 97 is interposed between the recess 942g formed in the inner surface of the above side wall 942d and the side wall of the first frame 93. A second adjustment screw 98 is screwed into the screw hole 942h formed in the side wall 942e, and the end of the second adjustment screw 98 is brought into contact with the side wall of the first frame 93. Therefore, when the second adjustment screw 98 is moved forward by turning in one direction, the first frame 93 is moved in one direction against the spring force of the compression coil spring 97 and when the second adjustment screw 98 is moved backward by turning in the other direction, the first frame 93 is moved in the other direction by the spring force of the compression coil spring 97. Thus, the second adjustment screw 98 and the compression coil spring 97 function as a moving adjustment means for moving the first frame 93 relative to the second frame 94 in a direction perpendicular to the converging direction of the cylindrical lens 91.

Figure 8:
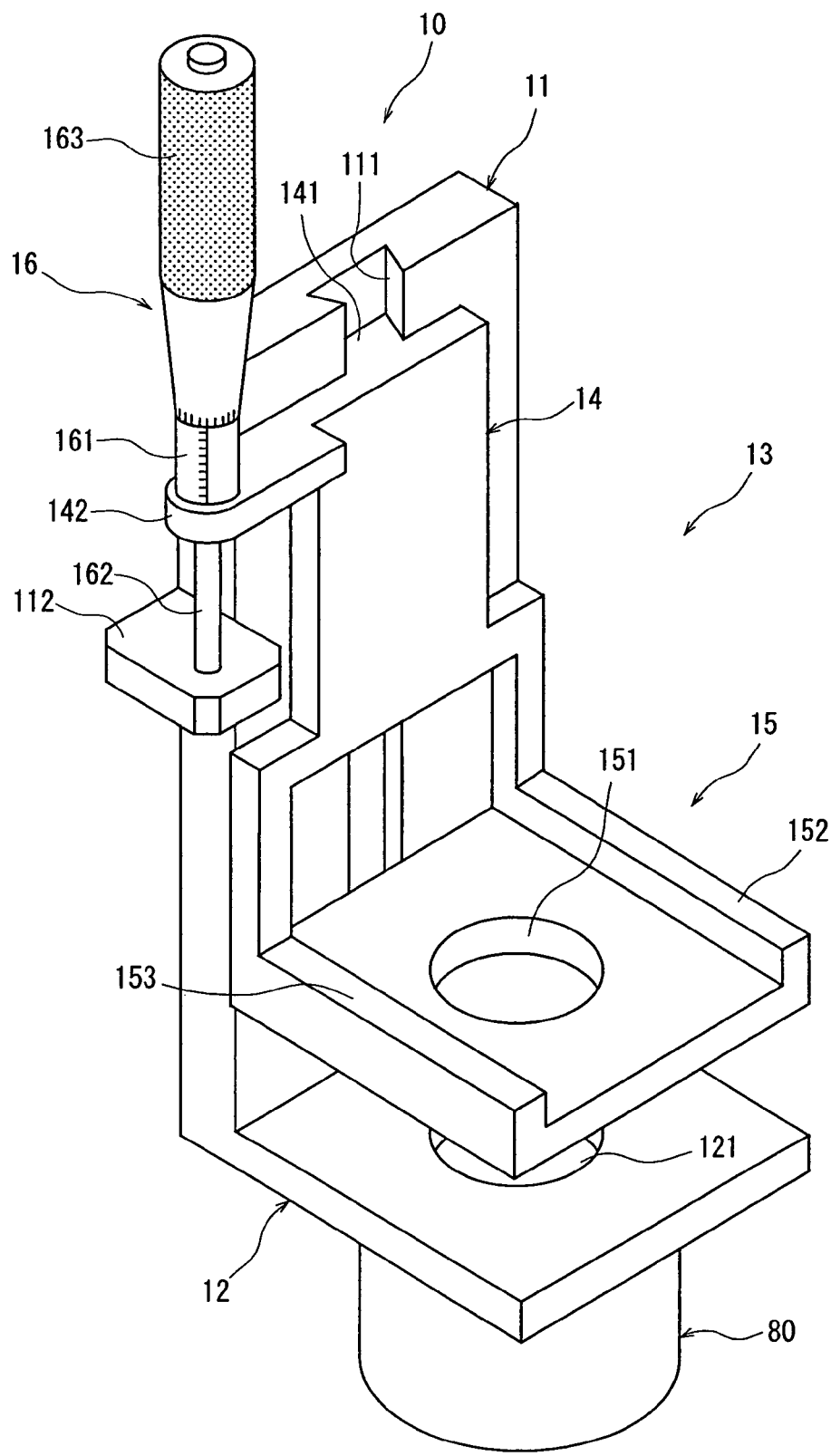
FIG. 8 is a perspective view of an interval adjustment mechanism for adjusting the interval between a condenser lens and a cylindrical lens unit provided in the laser processing beam machine shown in FIG. 1.

The cylindrical lens unit 9 constituted as described above is set in the interval adjustment mechanism 10 shown in FIG. 8. The interval adjustment mechanism 10 will be described hereinbelow.

The interval adjustment mechanism 10 shown in FIG. 8 comprises a support substrate 11, a condenser lens support plate 12 installed at the lower end of the support substrate 11, and a support table 13 arranged such that it can move in the vertical direction along the front surface of the support substrate 11.

A guide groove 111 is formed in the center portion of the front surface of the support substrate 11 in the vertical direction. A first adjustment plate 112 is fixed to the intermediate portion of the side wall of the support substrate 11. The condenser lens support plate 12 projects from the front surface of the support substrate 11 at a right angle. A hole 121 is formed in the center portion of this condenser lens support plate 12. The lens housing 80 is mounted on the undersurface of the condenser lens support plate 12 constituted as described above in such a manner that the condenser lens 8 is situated at a position corresponding to the hole 121.

The above support table 13 is composed of a support portion 14 and a table portion 15 installed at the lower end of the support portion 14. The support portion 14 has, on the back, a to-be-guided rail 141 to be fitted to the guide groove 111 formed in the above support substrate 11. By fitting this to-be-guided rail 141 to the guide groove 111, the support table 13 is supported to the support substrate 11 in such a manner that it can move along the guide groove 111 in the vertical direction. A second adjustment plate 142 positioned above the first adjustment plate 112 is fixed to the upper end of the support portion 14. The above table portion 15 projects from the front surface of the support portion 14 at a right angle. A hole 151 is formed in the center portion of the table portion 15. Positioning rails 152 and 153 each extending at a right angle from the front surface of the support substrate 11 are formed at both side ends of the table portion 15. The interval between the positioning rails 152 and 153 is set to a size corresponding to the width of the second frame 94 constituting the above cylindrical lens unit 9.

An adjustment screw means 16 is fitted in the above second adjustment plate 142. This adjustment screw means 16 comprises a support cylinder 161 mounted on the second adjustment plate 142, a metering rod 162 installed in the support cylinder 161 in such a manner that it can move in the vertical direction, and an adjustment dial 163 for moving the metering rod 162 in the vertical direction and is constituted to have the same structure as a micrometer. In the thus constituted adjustment screw means 16, the end (lower end) of the metering rod 162 is brought into contact with the top surface of the first adjustment plate 112 to restrict the position in the vertical direction of the support portion 14 constituting the support table 13. Therefore, by moving the metering rod 162 in the vertical direction by turning the adjustment dial 163 in one direction or the other direction, the position in the vertical direction of the support portion 14, that is, the interval between the table portion 15 installed at the lower end of the support portion 14 and the condenser lens support plate 12 can be changed. At this point, the movement of the metering rod 162 is adjusted based on a scale formed on the support cylinder 161 and the adjustment dial 163 to suitably adjust the interval between the table portion 15 of the support table 13 and the condenser lens support plate 12.

Figure 9:
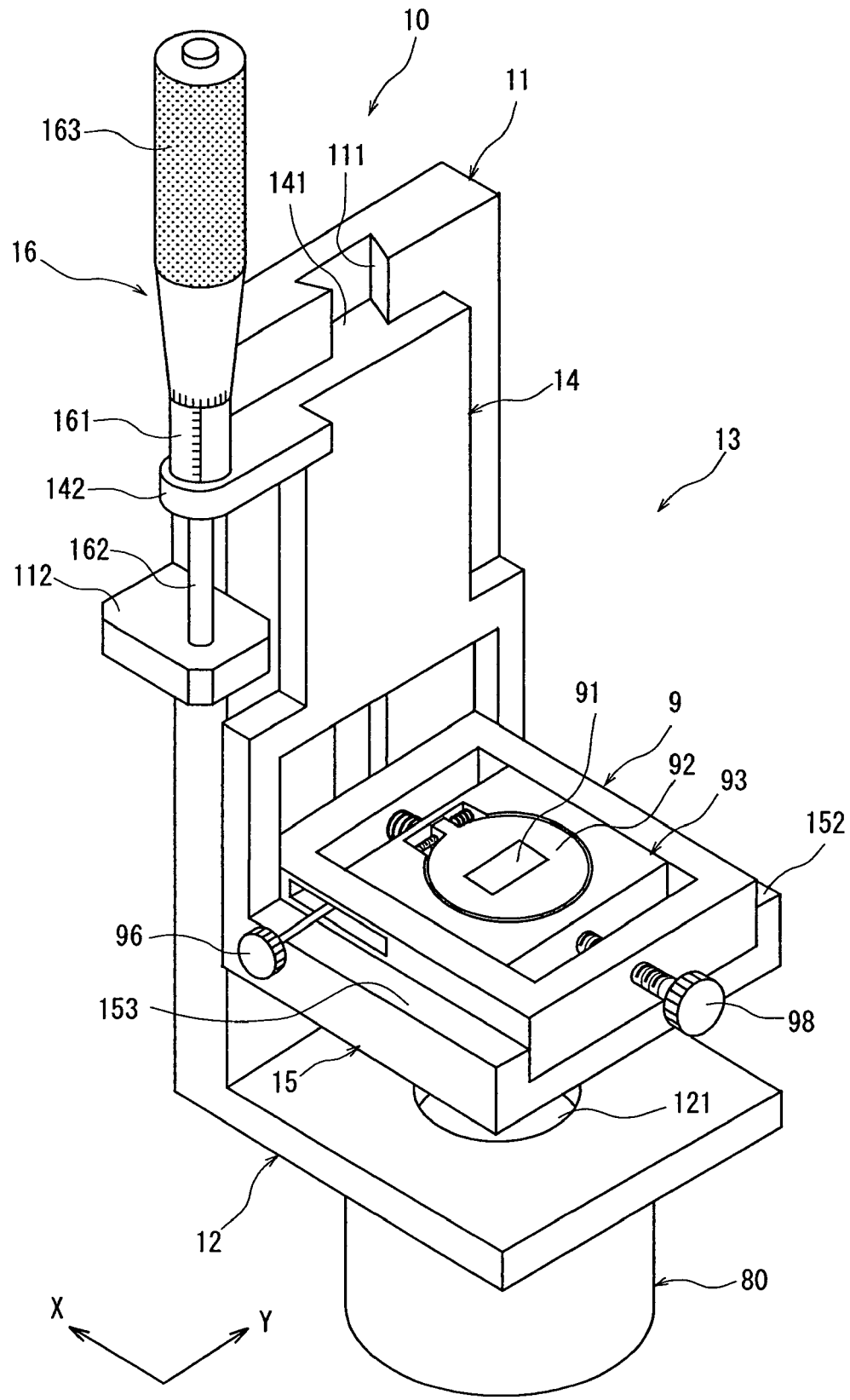
FIG. 9 is a perspective view of the interval adjustment mechanism shown in FIG. 8 in which the cylindrical lens unit is set.

The above cylindrical lens unit 9 is placed on the table portion 15 of the support table 13 of the interval adjustment mechanism 10 constituted as described above as shown in FIG. 9. That is, the second frame 94 of the cylindrical lens unit 9 is placed between the positioning rails 152 and 153 of the table portion 15 constituting the support table 13. The cylindrical lens unit 9 placed at a predetermined position on the table portion 15 of the support table 13 is fixed on the table portion 15 of the support table 13 by a suitable fixing means that is not shown. The converging direction of the cylindrical lens 91 of the cylindrical lens unit 9 placed on the table portion 15 of the support table 13 is set to the processing-feed direction indicated by the arrow X in FIG. 9.

Returning to FIG. 1, an image pick-up means 17 for detecting the area to be processed by the above laser beam application means 52 is mounted on the front end portion of the casing 521 constituting the above laser beam application means 52. This image pick-up means 17 comprises an image pick-up device (CCD) and supplies an image signal to a control means that is not shown.

The laser processing beam machine in the illustrated embodiment is constituted as described above, and its function will be described hereinunder.

The shape of the focal spot of a laser beam applied by the above-described laser beam application means 52 will be described with reference to FIGS. 10(a) to 10(c) and FIGS. 11(a) to 11(c).

Figure 10:
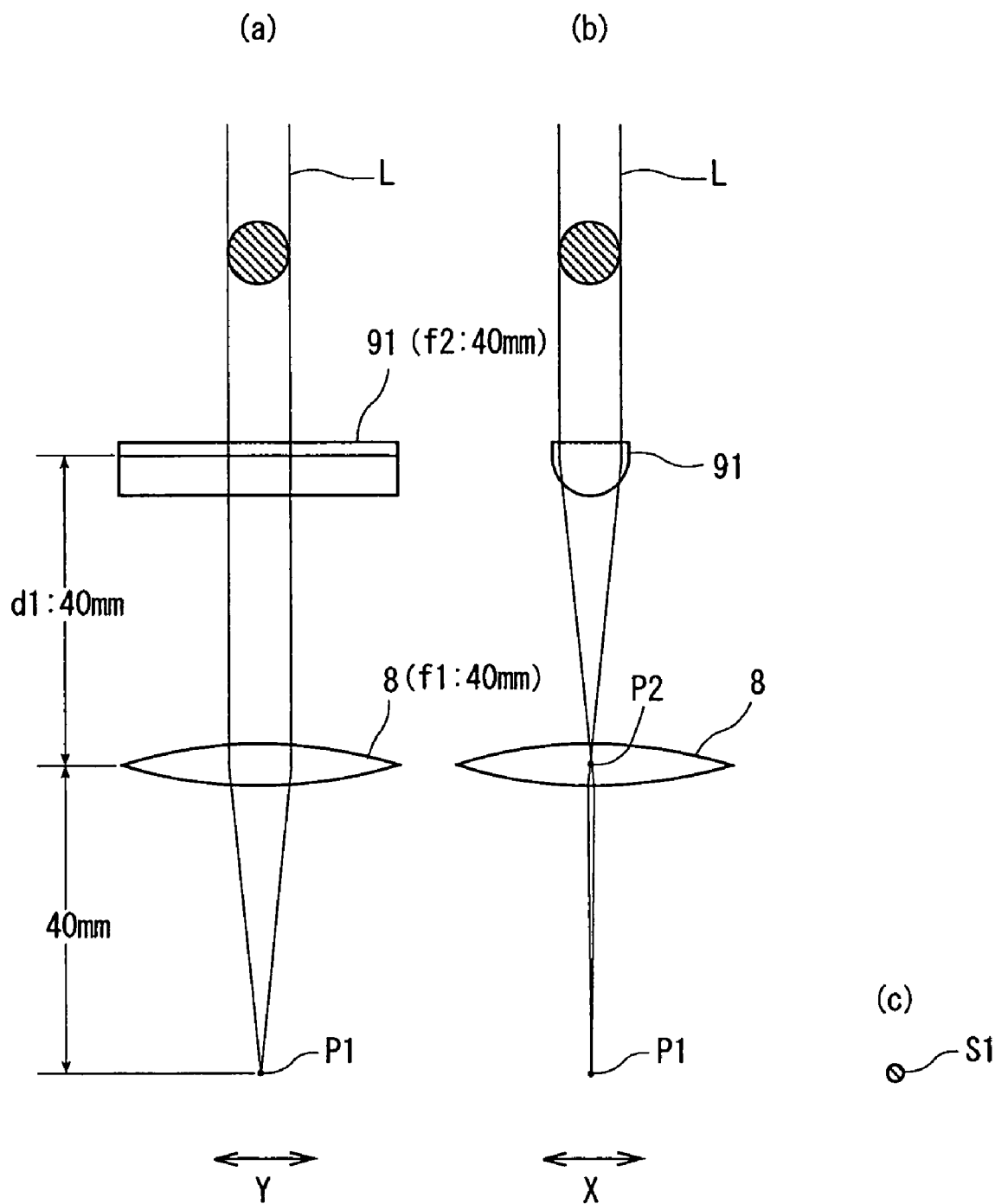
FIGS. 10(a), 10(b) and 10(c) are each explanatory diagrams showing a state wherein a focal spot having a circular section is formed by a condenser lens and a cylindrical lens which is a convex lens.

A description will be first given of a case where the interval (d1) between the cylindrical lens 91 and the condenser lens 8 is set to 40 mm which is the same as the focal distance (f2) of the cylindrical lens 91 as shown in FIGS. 10(a) and 10(b). In this case, the laser beam L is converged in the Y direction not by the cylindrical lens 91 but only by the condenser lens 8. That is, as shown in FIG. 10(a), the laser beam L passing through the cylindrical lens 91 is focused at a focal point P1 40 mm below the condenser lens 8, which is the focal distance (f1) of the condenser lens 8.

Meanwhile, the laser beam L is converged in the X direction by the cylindrical lens 91. That is, since the focal distance (f2) of the cylindrical lens 91 is set to 40 mm, the focal point P2 of the laser beam L focused in the X direction by the cylindrical lens 91 is existent at the center position of the condenser lens 8 as shown in FIG. 10(b). The laser beam L focused at the center position of the condenser lens 8 expands toward the undersurface of the condenser lens 8 and focused again at the above focal point P1 from the undersurface of the condenser lens 8. When the interval (d1) between the cylindrical lens 91 and the condenser lens 8 is made the same as the focal distance (f2) of the cylindrical lens 91, the laser beam L having a circular section entering the cylindrical lens 91 is converged by the cylindrical lens 91 in the X direction and by the condenser lens 8 in the Y direction, whereby a focal spot S1 having a circular section shown in the enlarged view of FIG. 10(c) is formed at the focal point P1. Therefore, when the workpiece is placed at the position of the focal point P1, the workpiece can be processed by means of the focal spot S1 having a circular section.

Figure 11:
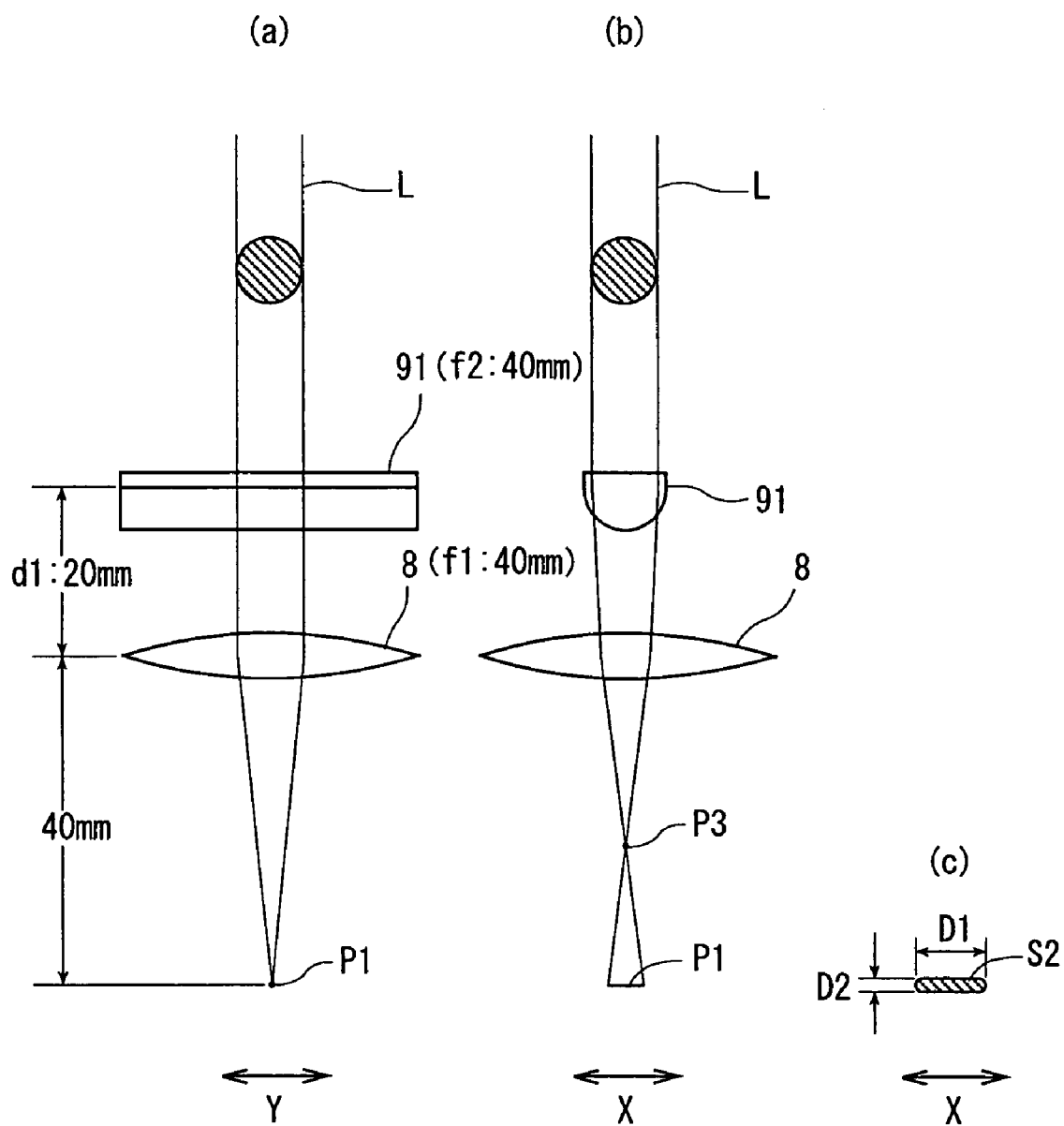
FIGS. 11(a), 11(b) and 11(c) are each explanatory diagrams showing a state wherein a focal spot having an elliptic section is formed by a condenser lens and a cylindrical lens which is a convex lens.

A description is subsequently given of a case where the interval (d1) between the cylindrical lens 91 and the condenser lens 8 is set to 20 mm which is half of the focal distance (f2) of the cylindrical lens 91 as shown in FIGS. 11(a) and 11(b). Also in this case, the laser beam L is converged in the Y direction not by the cylindrical lens 91 but only by the condenser lens 8. That is, as shown in FIG. 11(a), the laser beam L passing through the cylindrical lens 91 is focused at the focal point P1 40 mm below the condenser lens 8 which is the focal distance (f1) of the condenser lens 8.

Meanwhile, since the focal distance (f2) of the cylindrical lens 91 is set to 40 mm, the laser beam L which is converged in the X direction by the cylindrical lens 91 as shown in FIG. 11(b) enters into the condenser lens 8 before it is focused, further converged by the condenser lens 8 to be focused at a focal point P3 and then, expanded in the X direction until it reaches the workpiece. As a result, at the position of the focal point P1, a focal spot S2 having an elliptic section is formed as shown in the enlarged view of FIG. 11(c). The long axis D1 of the focal spot S2 having an elliptic section is formed in the direction indicated by the arrow X. The ratio of the long axis D1 to the short axis D2 of the focal spot S2 having an elliptic section can be adjusted by changing the interval (d1) between the condenser lens 8 and the cylindrical lens 91. Therefore, when the workpiece is placed at the position of the focal point P1, the workpiece can be processed by means of the focal spot S2 having an elliptic section.

A description will be subsequently given of a case where the cylindrical lens 91 constituting the above cylindrical lens unit 9 is a concave lens with reference to FIGS. 12(a) to 12(c). In this case, the focal distance (f2) of the cylindrical lens 91 which is a concave lens is set to −40 mm and the interval (d1) between the cylindrical lens 9 and the condenser lens 8 is set to 20 mm.

Also in this case, the laser beam L is converged in the Y direction not by the cylindrical lens 91 but only by the condenser lens 8. That is, as shown in FIG. 12(a), the laser beam L passing through the cylindrical lens 91 is focused at the focal point (P1) 40 mm below the condenser lens 8, which is the focal distance (f1) of the condenser lens 8.

Figure 12:
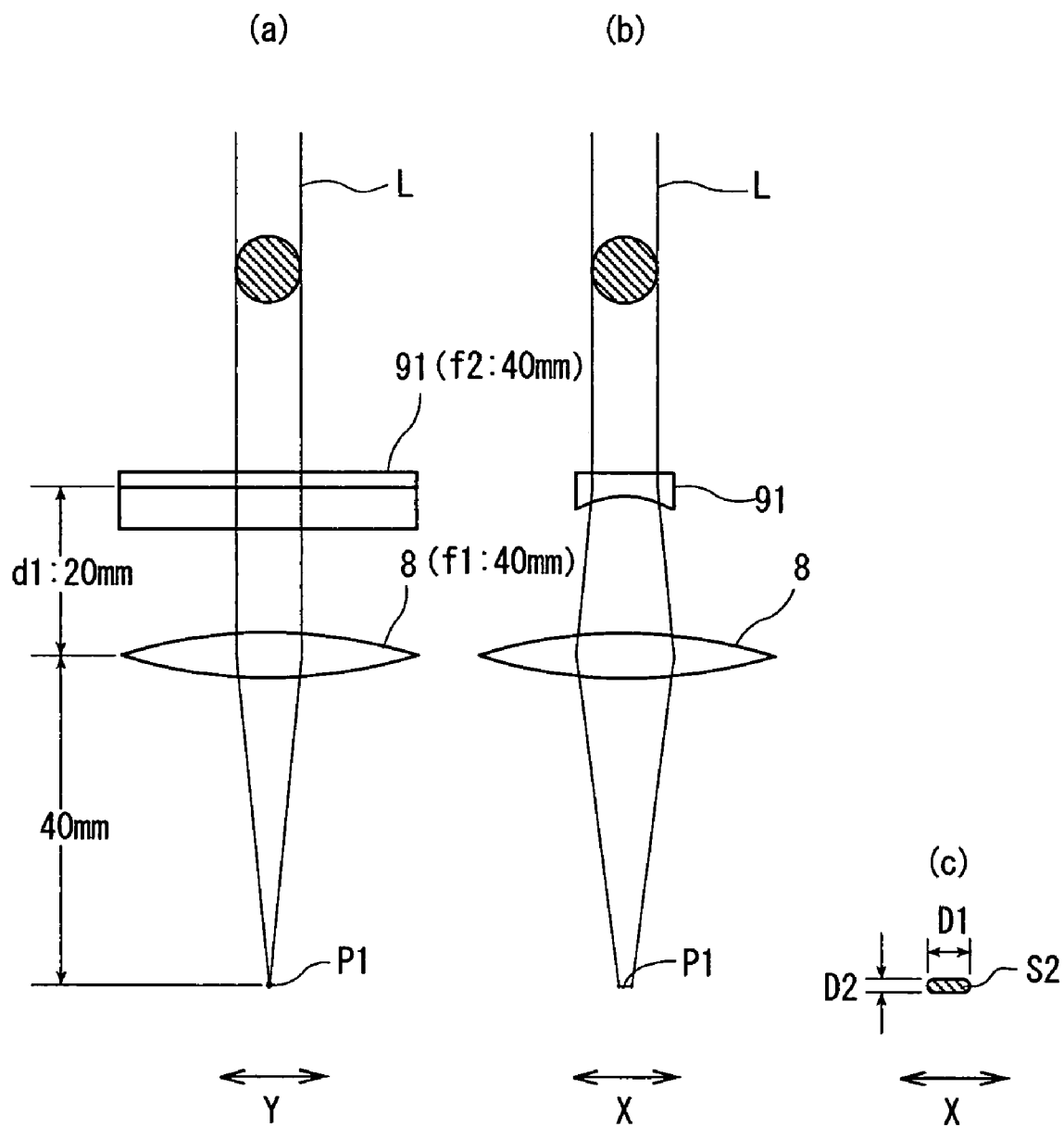
FIGS. 12(a), 12(b) and 12(c) are each explanatory diagrams showing a state wherein a focal spot having an elliptic section is formed by a condenser lens and a cylindrical lens which is a concave lens.

Since the focal distance (f2) of the cylindrical lens 91 which is a concave lens is set to −40 mm, the laser beam L diverged in the X direction by the cylindrical lens 91 is converged by the condenser lens 8, as shown in FIG. 12(b). However, the laser beam reaches the above focal point (P1) which is the focal distance (f1) of the condenser lens 8 before it is focused by the condenser lens 8 as it is diverged in the X direction by the cylindrical lens 91. As a result, at the position of the focal point (P1) which is the focal distance (f1) of the condenser lens 8, a focal spot S2 having an elliptic section is formed as shown in the enlarged view of FIG. 12(c). The long axis D1 of this focal spot S2 having an elliptic section is formed toward the direction indicated by the arrow X. The ratio of the long axis D1 to the short axis D2 of the focal spot S2 having an elliptic section can be adjusted by changing the interval (d1) between the condenser lens 8 and the cylindrical lens 91. Therefore, when the workpiece is placed at the position of the focal point P1, the workpiece can be processed by means of the focal spot S2 having an elliptic section.

A description will be subsequently given of a processing method for forming a groove in the workpiece by means of the focal spot S2 having an elliptic section shown in FIGS. 11(a) to 11(c) and FIGS. 12(a) to 12(c) with reference to FIG. 1 and FIGS. 12(a) to 12(c).

A semiconductor wafer W as the workpiece is first placed on the chuck table 36 of the laser processing beam machine shown in FIG. 1. The semiconductor wafer W is suction-held on the chuck table 36 by activating a suction means that is not shown. Streets are formed in a lattice pattern on the front surface of the semiconductor wafer W and a device such as IC or LSI is formed in a plurality of areas sectioned by the lattice pattern-like streets. The chuck table 36 suction-holding the semiconductor wafer W is brought to a position right below the image pick-up means 17 by the processing-feed means 37. After the chuck table 36 is positioned right below the image pick-up means 17, alignment work for detecting the area to be processed of the semiconductor wafer W is carried out by the image pick-up means 17 and the control means that is not shown. That is, the image pick-up means 17 and the control means (not shown) carry out image processing such as pattern matching, etc. to align a street formed in a predetermined direction of the semiconductor wafer W with the condenser 7 of the laser beam application means 52 for applying a laser beam along the street, thereby performing the alignment of a laser beam application position. The alignment of the laser beam application position is also carried out on streets formed on the semiconductor wafer W in a direction perpendicular to the above predetermined direction.

Figure 13:
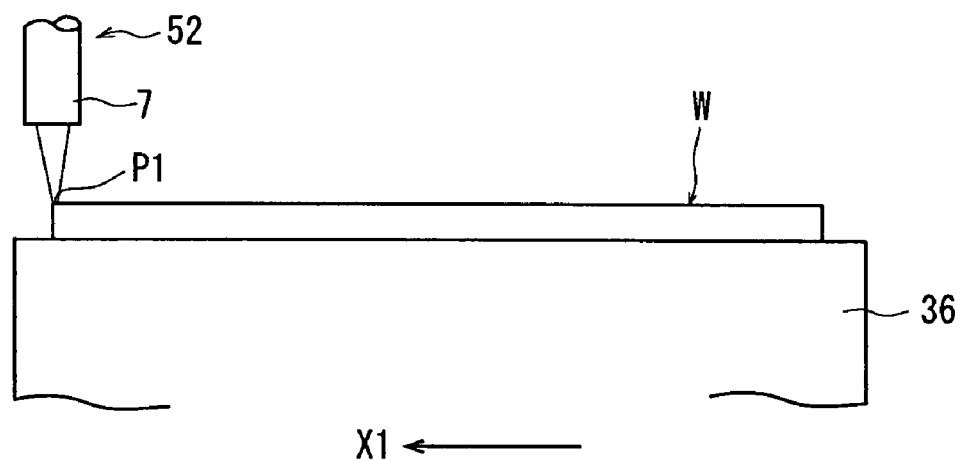
FIGS. 13(a) and 13(b) are explanatory diagrams showing a groove forming step which is carried out by the laser processing beam machine shown in FIG. 1.
Figure 13:
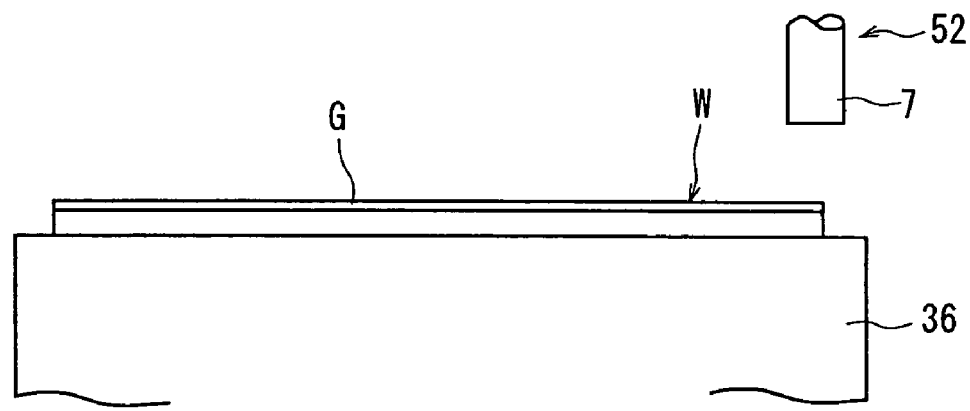

After the alignment of the laser beam application position is carried out by detecting the street formed on the semiconductor wafer W held on the chuck table 36 as described above, as shown in FIG. 13(a), the chuck table 36 is moved to a laser beam application area where the condenser 7 of the laser beam application means 52 is located so as to bring one end (left end in FIG. 13(a)) of the predetermined street to a position right below the condenser 7. The long axis D1 shown in FIG. 11(c) and FIG. 12(c) of the focal spot S2 having an elliptic section of the laser beam irradiated from the condenser 7 is aligned with the street. The focal point P1 of the pulse laser beam irradiated from the condenser 7 is set to a position near the front surface (top surface) of the semiconductor wafer W. The moving means 53 for moving the laser beam application means 52 along the guide rails 423 and 423 in the direction indicated by the arrow Z is used to set the focal point P1 to a position near the front surface (top surface) of the semiconductor wafer W. The chuck table 36, that is, the semiconductor wafer W is then moved in the direction indicated by the arrow X1 in FIG. 13(a) at a predetermined processing-feed rate while a pulse laser beam of a wavelength having absorptivity for the semiconductor wafer W is applied from the condenser 7 of the laser beam application means 52. When the other end (right end in FIG. 13(b)) of the street reaches a position right below the condenser 7, the application of the pulse laser beam is suspended, and the movement of the chuck table 36, that is, the semiconductor wafer W is stopped. As a result, a groove G is formed along the street in the semiconductor wafer W as shown in FIG. 13(b) (groove forming step).

The above groove forming step is carried out under the following processing conditions, for example.

Light source of laser beam: YVO4 laser or YAG laser
Wavelength: 355 nm
Repetition frequency: 50 kHz
Average output: 4 W
Focal spot: elliptic, long axis (D1) of 200 μm, short axis (D2) of 10 μm
Processing-feed rate: 150 mm/sec To form a hole such as a via hole in the workpiece such as the semiconductor wafer W by means of the focal spot S1 having a circular section shown in FIG. 10(c), the via hole forming position of the semiconductor wafer W held on the chuck table 36 is brought to a position right below the condenser 7. The focal point P1 of the pulse laser beam applied from the condenser 7 is set to a position near the front surface (top surface) of the semiconductor wafer W. To align the focal point P1 with a position near the front surface (top surface) of the semiconductor wafer W, there is used the moving means 53 for moving the laser beam application means 52 along the guide rails 423 and 423 in the direction indicated by the arrow Z. Then, a predetermined number of pulses of the pulse laser beam of a wavelength having absorptivity for the semiconductor wafer W are applied from the condenser 7 of the laser beam application means 52 to form a hole such as a via hole at a predetermined position of the semiconductor wafer W.

Since the laser-processing beam machine comprising the condenser 7 in the first embodiment of the present invention comprises the interval adjustment mechanism 10 for adjusting the interval between the condenser lens 8 and the cylindrical lens unit 9 to adjust the interval (d1) between the condenser lens 8 and the cylindrical lens unit 9 as described above, the focal spot S1 having a circular section and the focal spot S2 having an elliptic section can be formed, and the ratio of the long axis D1 to the short axis D2 of the focal spot S2 having an elliptic section can be suitably changed. Therefore, the shape of a focal spot suitable for laser processing can be suitably set.

A description will be subsequently given of a second embodiment of the condenser 7 with reference to FIGS. 14 to 19. In the second embodiment, the same members as the constituent members of the condenser 7 shown in FIGS. 3 to 7 are given the same reference numerals, and their detailed descriptions are omitted.

The condenser 7 in the second embodiment comprises a first cylindrical lens unit 9a and a second cylindrical lens unit 9b on the upstream side in the laser beam application direction of the condenser lens 8, that is, between the condenser lens 8 and the direction changing mirror 61. The first cylindrical lens unit 9a has a first cylindrical lens 91a which is a convex lens, and the second cylindrical lens unit 9b has a second cylindrical lens 91b which is a concave lens.

Figure 15:
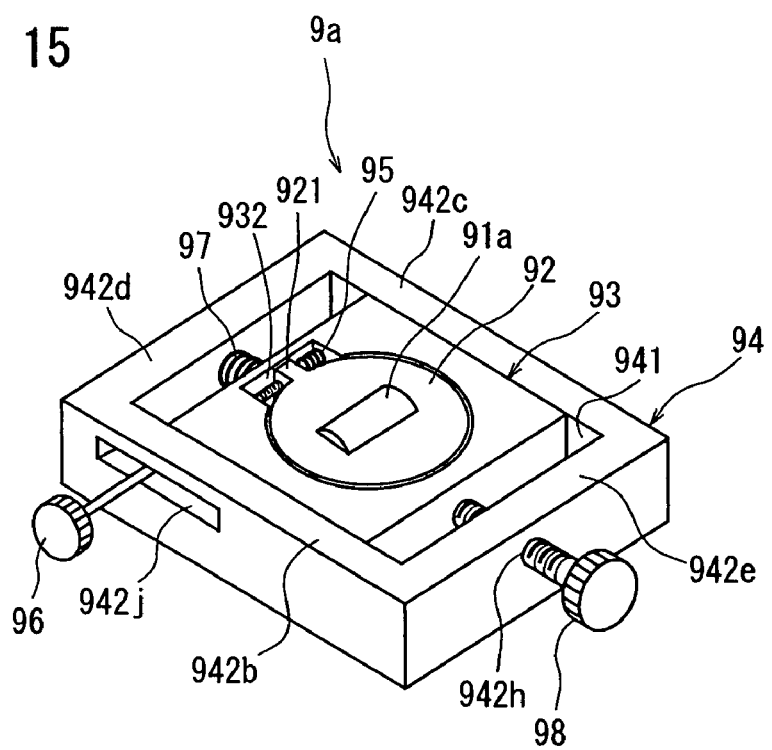
FIG. 15 is a perspective view of a first cylindrical lens unit constituting the condenser of the processing head shown in FIG. 14.
Figure 16:
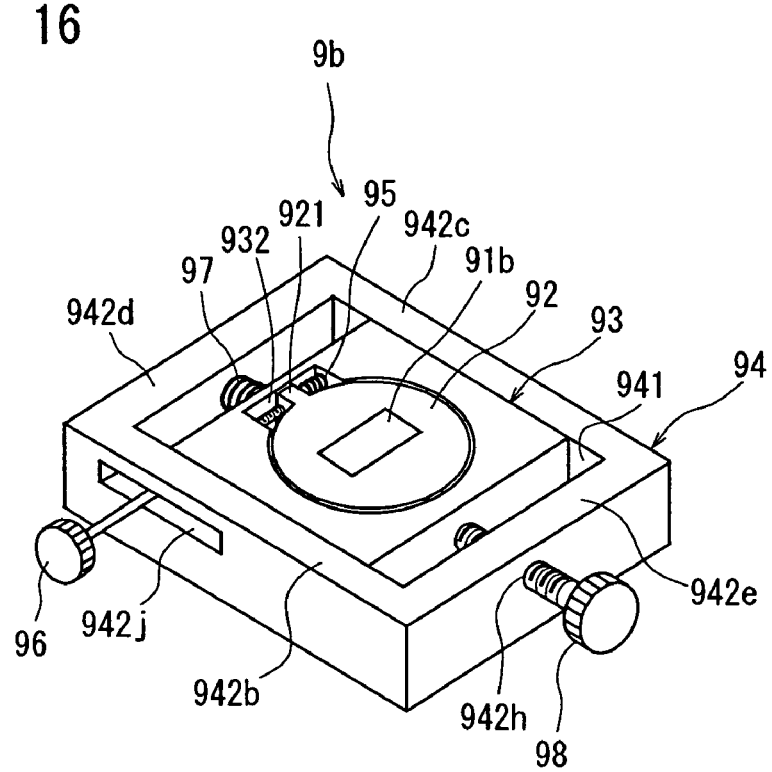
FIG. 16 is a perspective view of a second cylindrical lens unit constituting the condenser of the processing head shown in FIG. 14.

The first cylindrical lens unit 9a is constituted such that the first cylindrical lens 91a is set in the first frame 93 as shown in FIG. 15 in a state where it is held in the lens holding member 92 shown in FIG. 5 and FIG. 6 and further is set in the second frame 94 in a state where it is set in the first frame 93. The second cylindrical lens unit 9b is constituted such that the second cylindrical lens 91b is set in the first frame 93 as shown in FIG. 16 in a state where it is held in the lens holding member 92 shown in FIG. 5 and FIG. 6 and further set in the second frame 94 in a state where it is set in the first frame 93.

Figure 17:
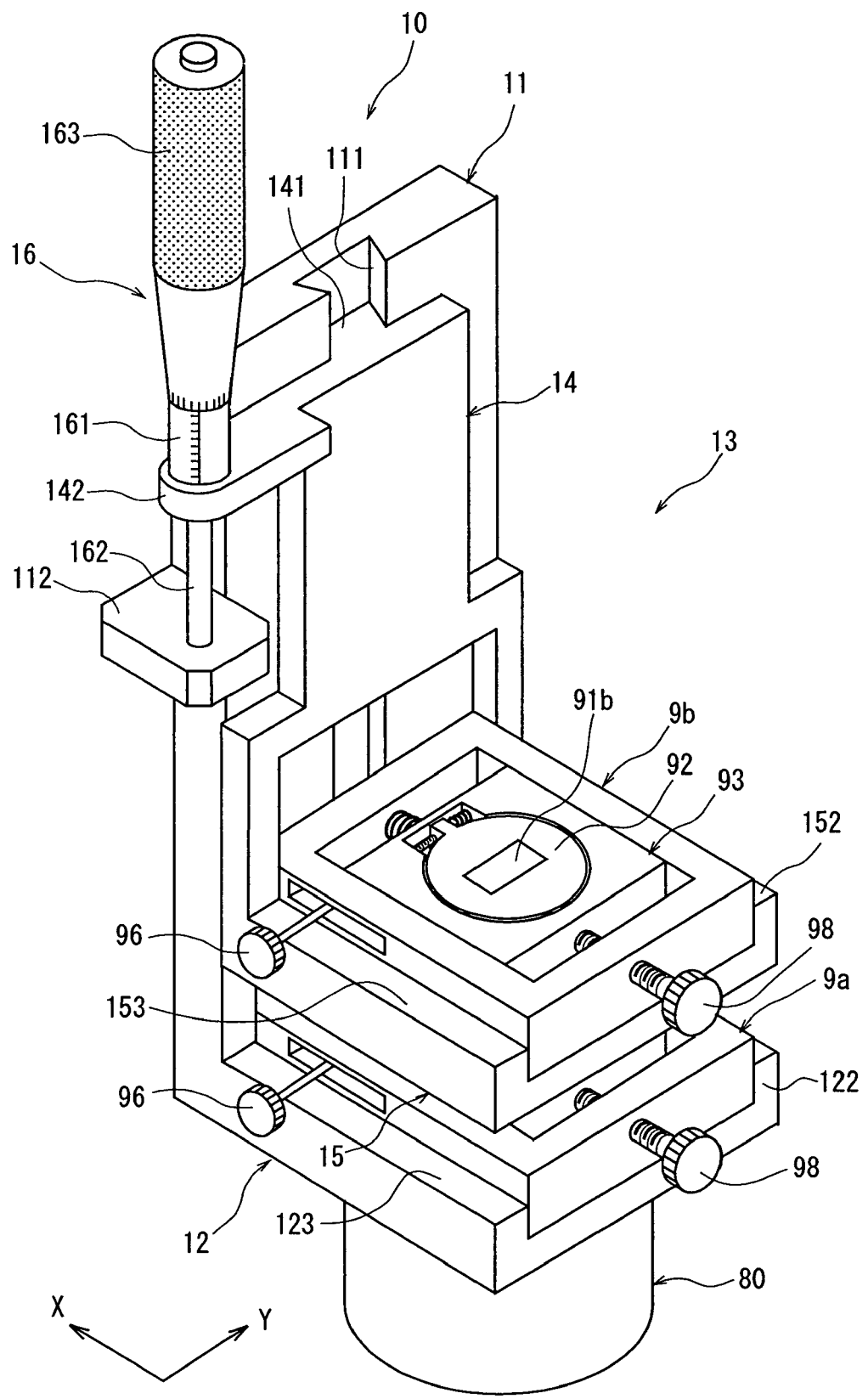
FIG. 17 is a perspective view of the interval adjustment mechanism in which the first cylindrical lens unit and the second cylindrical lens unit are set.
Figure 18:
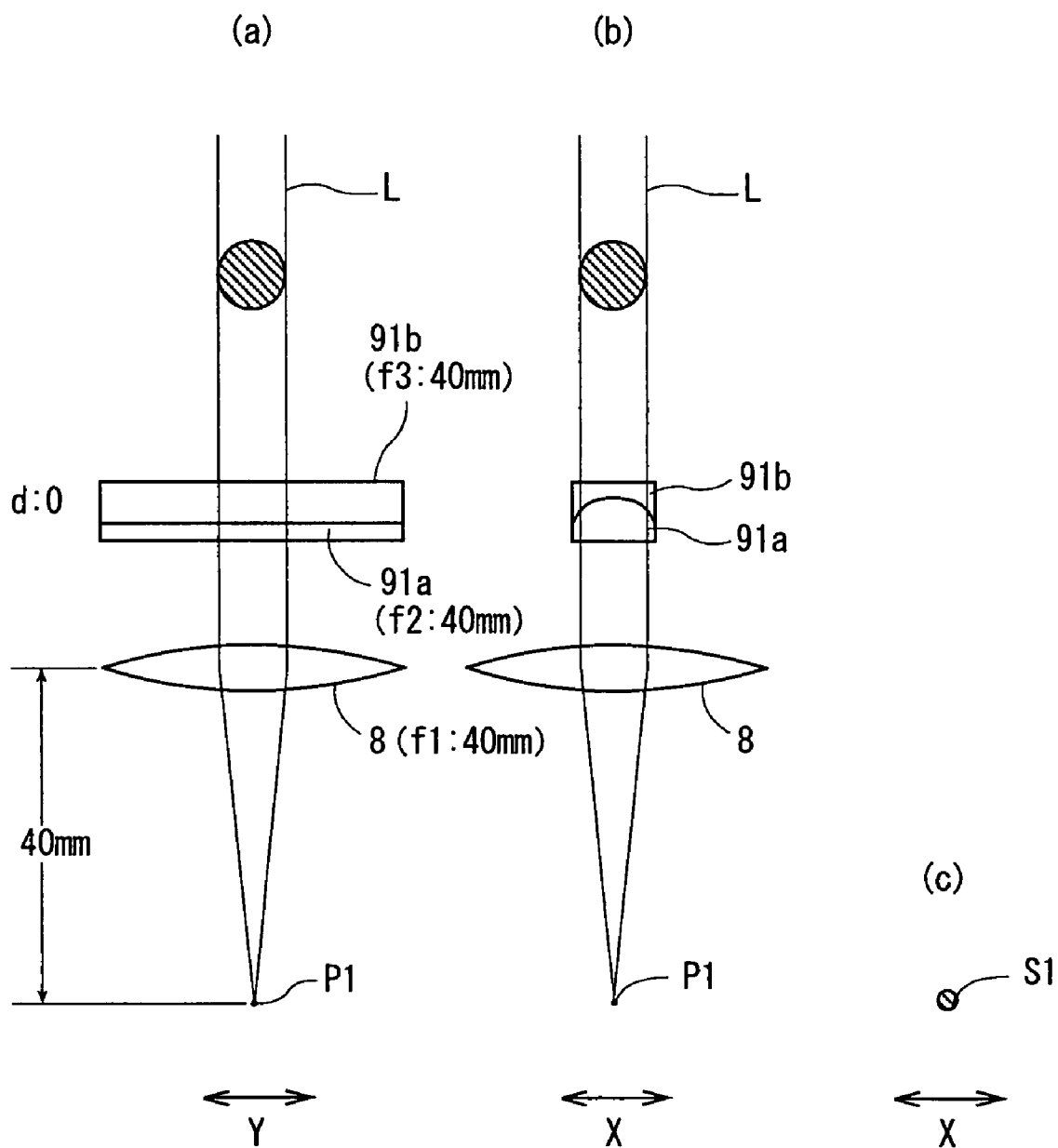
FIGS. 18(a), 18(b) and 18(c) are each explanatory diagrams showing a state wherein a focal spot having a circular section is formed by the condenser lens, the first cylindrical lens and the second cylindrical lens.
Figure 19:
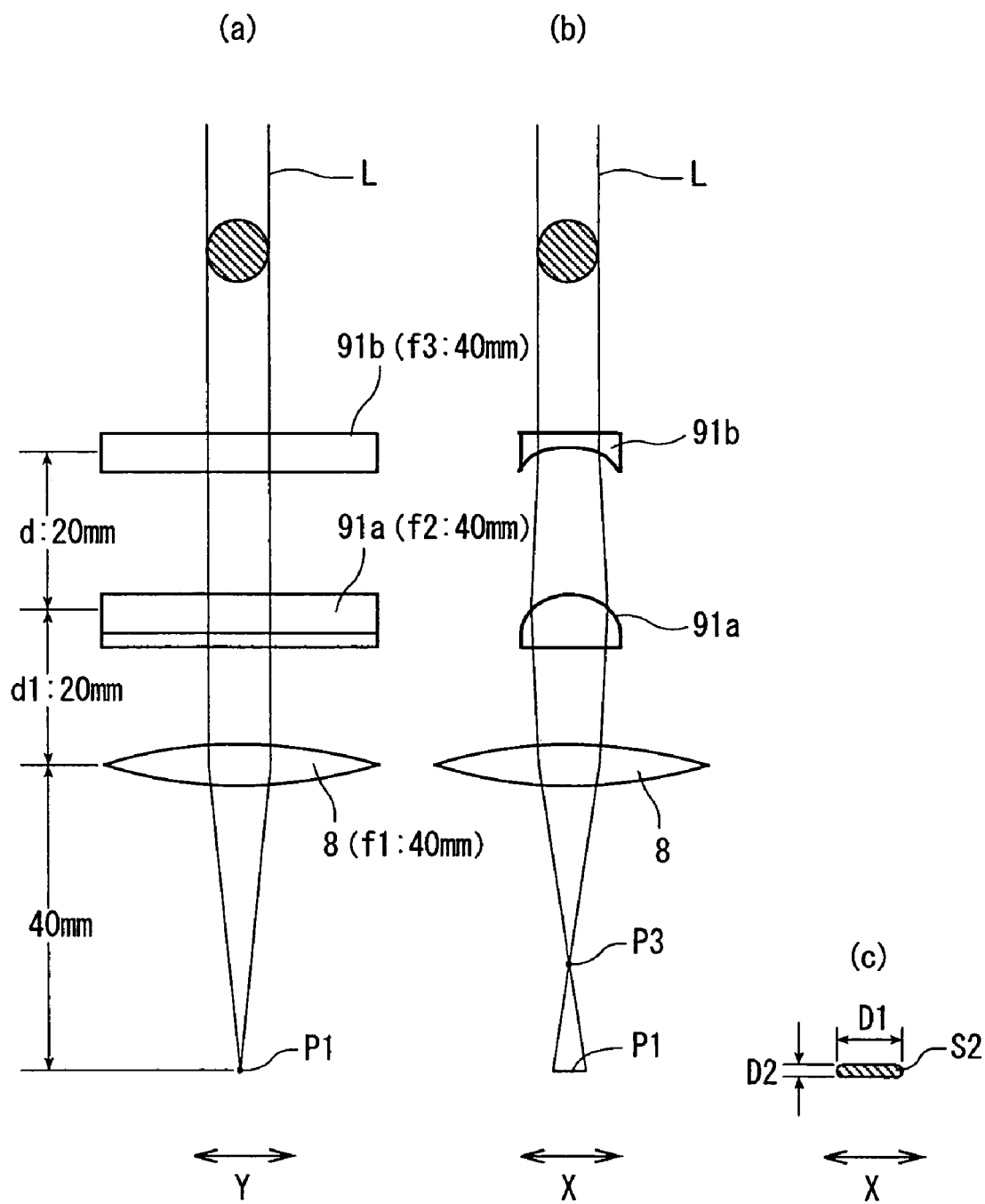
FIGS. 19(a), 19(b) and 19(c) are each explanatory diagrams showing a state wherein a focal spot having an elliptic section is formed by the condenser lens, the first cylindrical lens and the second cylindrical lens.

The first cylindrical lens unit 9a and the second cylindrical lens unit 9b are set in the interval adjustment mechanism 10 as shown in FIG. 17. Since the interval adjustment mechanism 10 is substantially the same as the interval adjustment mechanism 10 in constitution except for difference in part of the condenser lens support plate 12, the same members are given the same reference numerals, and their detailed description are omitted.

Positioning rails 122 and 123 extending from the foreface of the support substrate 11 at a right angle are formed at both side ends of the condenser lens support plate 12 of the interval adjustment mechanism 10 shown in FIG. 17. The interval between the positioning rails 122 and 123 is set to a size corresponding to the width of the second frame 94 constituting the above first cylindrical lens unit 9a.

The first cylindrical lens unit 9a is placed on the top surface of the condenser lens support plate 12 of the interval adjustment mechanism 10 constituted as described above, as shown in FIG. 17. That is, the second frame 94 of the first cylindrical lens unit 9a is placed between the positioning rails 122 and 123 of the condenser lens support plate 12. The first cylindrical lens unit 9a placed at a predetermined position on the condenser lens support plate 12 is fixed on the condenser lens support plate 12 by a suitable fixing means that is not shown. The converging direction of the first cylindrical lens 91a of the first cylindrical lens unit 9a placed on the condenser lens support plate 12 is set to the processing-feed direction indicated by the arrow X in FIG. 17.

Meanwhile, the second cylindrical lens unit 9b is placed on the table portion 15 constituting the support table 13 of the interval adjustment mechanism 10 as shown in FIG. 17. That is, the second frame 94 of the second cylindrical lens unit 9b is placed between the positioning rails 152 and 153 of the table portion 15 constituting the support table 13. The second cylindrical lens unit 9b placed at a predetermined position on the table portion 15 of the support table 13 is fixed on the table portion 15 of the support table 13 by a suitable fixing means that is not shown. The converging direction of the second cylindrical lens 91b of the second cylindrical lens unit 9b placed on the table portion 15 of the support table 13 is set to the processing-feed direction indicated by the arrow X in FIG. 17.

The condenser 7 in the second embodiment is constituted as described above, and its function will be described hereinunder.

The shape of the focal spot of the laser beam applied by the above laser beam application means 52 will be described with reference to FIG. 14, FIGS. 18(a) to 18(c) and FIGS. 19(a) to 19(c).

Figure 14:
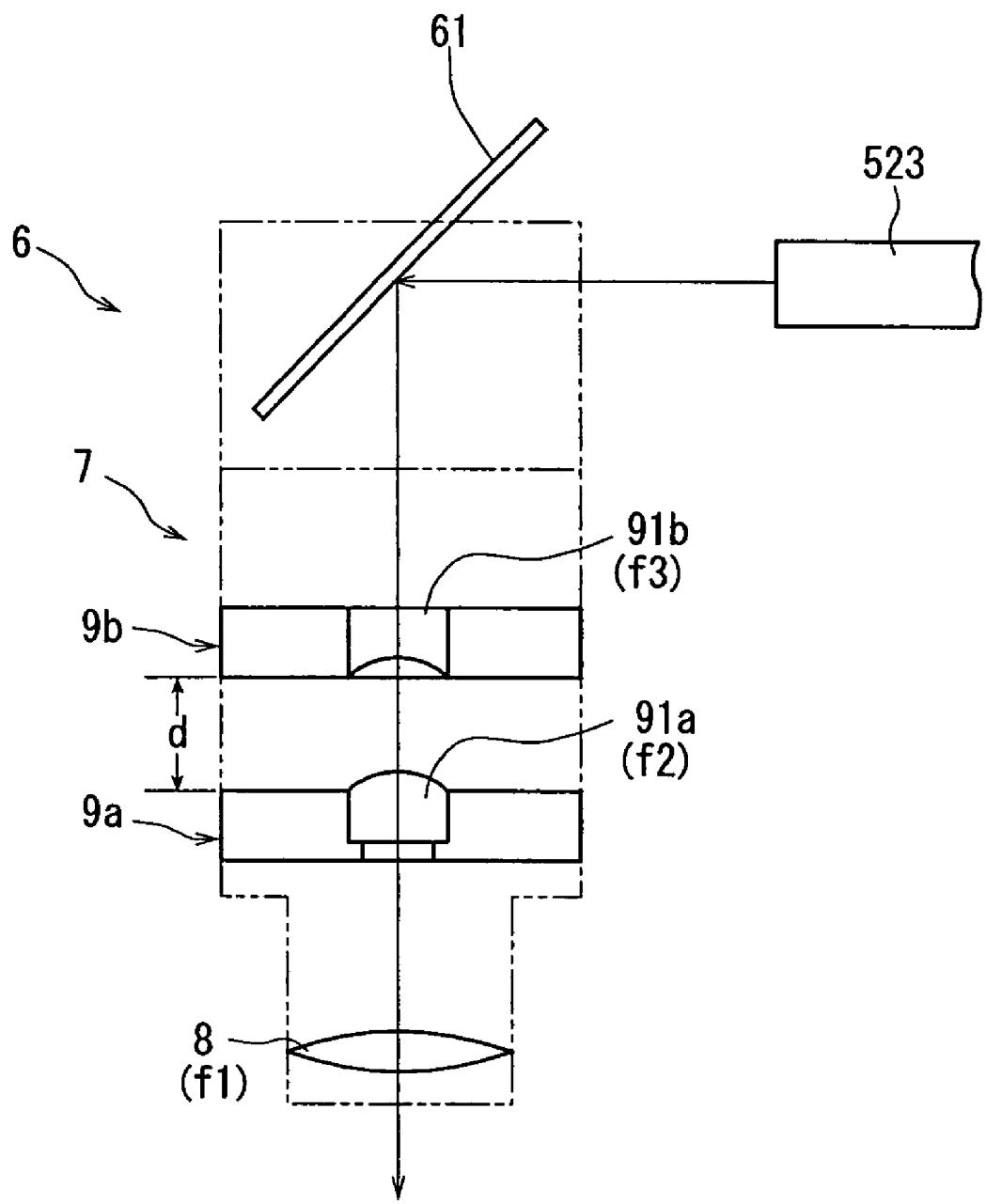
FIG. 14 is an explanatory diagram of a processing head comprising a condenser of a second embodiment.

When the focal distance of the first cylindrical lens 91a of the first cylindrical lens unit 9a is represented by (f2), the focal distance of the second cylindrical lens 91b of the second cylindrical lens unit 9b is represented by (f3), and the interval between the first cylindrical lens 91a and the second cylindrical lens 91b is represented by d as shown in FIG. 14, the focal distance (f) of the cylindrical lens set consisting of the first cylindrical lens 91a and the second cylindrical lens 91b is obtained by the equation f=(f2×f3)/(f2+f3−d).

A description will be first given of a case where the interval (d) between the first cylindrical lens 91a and the second cylindrical lens 91b is made nil by bonding them together as shown in FIGS. 18(a) and 18(b). The focal distance (f2) of the first cylindrical lens 91a is set to 40 mm, the focal distance (f3) of the second cylindrical lens 91b is set to −40 mm, and the focal distance (f1) of the condenser lens 8 is set to 40 mm. In this case, the laser beam L is converged in the Y direction not by the first cylindrical lens 91a and the second cylindrical lens 91b but only by the condenser lens 8. That is, as shown in FIG. 18(a), the laser beam passing through the first cylindrical lens 91a and the second cylindrical lens 91b is focused at the focal point (P1) 40 mm below the condenser lens 8, which is the focal distance (f1) of the condenser lens 8.

The X direction of the laser beam passing through the first cylindrical lens 91a and the second cylindrical lens 91b will be described with reference to FIG. 18(b). Since the interval (d) between the first cylindrical lens 91a and the second cylindrical lens 91b is nil, the focal distance (f) of the cylindrical lens set becomes nil because the denominator of the equation f=(f2×f3)/(f2+f3−d) becomes (40+(−40)−0)=(0). Therefore, as the focal distance (f) of the cylindrical lens set becomes infinite, the laser beam L passing through the first cylindrical lens 91a and the second cylindrical lens 91b becomes parallel in the X direction. The laser beam L passing through the first cylindrical lens 91a and the second cylindrical lens 91b is focused in the X direction at the focal point (P1) 40 mm below the condenser lens 8, which is the focal distance (f1) of the condenser lens 8. When the interval between the first cylindrical lens 91a and the second cylindrical lens 91b is made nil, a focal spot S1 having a circular section is formed at the focal point P1 which is the focal distance (f1) of the condenser lens 8 as shown in the enlarged view of FIG. 18(c). Therefore, when the workpiece is placed at the position of the focal point P1, it can be processed by means of the focal spot S1 having a circular section.

A description will be subsequently given of a case where the interval (d) between the first cylindrical lens 91a and the second cylindrical lens 91b is set to 20 mm as shown in FIG. 19(a) and 19(b) and the interval (d1) between the second cylindrical lens 91b and the condenser lens 8 is set to 20 mm as well. Also in this case, the laser beam L is converged in the Y direction not by the first cylindrical lens 91a and the second cylindrical lens 91b but only by the condenser lens 8. That is, as shown in FIG. 19(a), the laser beam passing through the first cylindrical lens 91a and the second cylindrical lens 91b is focused at the focal point (P1) 40 mm below the condenser lens 8, which is the focal distance (f1) of the condenser lens 8.

The X direction of the laser beam passing through the first cylindrical lens 91a and the second cylindrical lens 91b will be described with reference to FIG. 19(b). In this case, the focal distance (f) of the cylindrical lens set consisting of the first cylindrical lens 91a and the second cylindrical lens 91b is obtained by the equation f=(f2×f3)/(f2+f3−d)=(40×(−40)/(40+(−40)−20)=80. Therefore, the laser beam L converged in the X direction by the cylindrical lens set consisting of the first cylindrical lens 91a and the second cylindrical lens 91b enters into the condenser lens 8 before it is focused, further converged by the condenser lens 8 to be focused at the focal point P3 and then expanded in the direction indicated by the arrow X until it reaches the workpiece. As a result, at the position of the focal point P1, a focal spot S2 having an elliptic section is formed as shown in the enlarged view of FIG. 19(c). The long axis D1 of this focal spot S2 having an elliptic section is formed in the direction indicated by the arrow X. The ratio of the long axis D1 to the short axis D2 of the focal spot S2 having an elliptic section can be adjusted by changing the interval (d) between the first cylindrical lens 91a and the second cylindrical lens 91b. Therefore, when the workpiece is placed at the position of the focal point P1, it can be processed by means of the focal spot S2 having an elliptic section.

Since the laser processing beam machine comprising the condenser 7 in the second embodiment of the present invention comprises the interval adjustment mechanism 10 for adjusting the interval between the first cylindrical lens 91a and the second cylindrical lens 91b to adjust the interval (d) between the first cylindrical lens 91a and the second cylindrical lens 91b as described above, the focal spot S1 having a circular section and the focal spot S2 having an elliptic section can be formed, and the ratio of the long axis D1 to the short axis D2 of the focal spot S2 having an elliptic section can be suitably changed. Consequently, the shape of a focal spot suitable for laser processing can be suitably selected.

What is claimed is:

1. A laser processing machine comprising a chuck table for holding a workpiece, a laser beam application means for applying a laser beam to the workpiece held on the chuck table, and a feed means for moving the chuck table and the laser beam application means relative to each other,
  wherein the laser beam application means comprises a laser beam oscillation means for oscillating a laser beam and a condenser for converging the laser beam oscillated by the laser beam oscillation means;
  wherein the condenser comprises a condenser lens opposed to the workpiece held on the chuck table, a first cylindrical lens unit comprising a first cylindrical lens which is convex, a second cylindrical lens unit comprising a second cylindrical lens which is concave, and an interval adjustment mechanism that moves the second cylindrical lens for adjusting the interval between the first cylindrical lens and the second cylindrical lens,
  wherein the first cylindrical lens and the second cylindrical lens are arranged upstream, in the laser beam application direction, of the condenser lens with the first cylindrical lens arranged between the condenser lens and the second cylindrical lens so that the first cylindrical lens and the second cylindrical lens converge or diverge the laser beam in a processing feed direction,
  wherein the first cylindrical lens unit is provided with a first lens holding member for holding the first cylindrical lens, a first frame having a circular hollow where the first lens holding member is fitted to be rotatable along the inner peripheral portion thereof, and a second frame in which the first frame is arranged to be movable in the processing feed direction with first moving adjustment means, and wherein the second cylindrical lens unit is provided with a second lens holding member for holding the second cylindrical lens, a first frame having a circular hollow where the second lens holding member is fitted to be rotatable along the inner peripheral portion thereof, and a second frame in which the first frame is arranged to be movable in the processing feed direction with second moving adjustment means.

* * * * *